(12) United States Patent
Krabbenhöft et al.

(10) Patent No.: US 6,775,030 B2
(45) Date of Patent: Aug. 10, 2004

(54) METHOD OF ADAPTING A PRINTING PROCESS WHILE MAINTAINING THE BLACK BUILD-UP

(75) Inventors: Uwe-Jens Krabbenhöft, Landwehr (DE); Günter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 297 days.

(21) Appl. No.: 10/109,775

(22) Filed: Mar. 28, 2002

(65) Prior Publication Data

US 2002/0131063 A1 Sep. 19, 2002

Related U.S. Application Data

(63) Continuation of application No. PCT/DE00/02959, filed on Aug. 31, 2000.

(30) Foreign Application Priority Data

Sep. 29, 1999 (DE) .......................................... 199 46 585

(51) Int. Cl.[7] .............................................. G06K 15/00
(52) U.S. Cl. ..................................... 358/1.9; 358/3.24
(58) Field of Search ........................ 358/1.1, 1.9, 3.24, 358/3.06, 3.1, 3.13, 3.23, 3.27, 515, 518, 529, 536, 451; 382/163, 167, 276, 284, 299, 302, 307

(56) References Cited

U.S. PATENT DOCUMENTS

| | | | | |
|---|---|---|---|---|
| 5,134,494 | A | | 7/1992 | Numakura et al. ......... 101/486 |
| 5,710,827 | A | * | 1/1998 | Perumaln et al. ........... 382/167 |
| 5,930,468 | A | | 7/1999 | Zingher et al. ............ 358/1.16 |
| 6,029,576 | A | | 2/2000 | Fischer et al. .............. 358/518 |
| 6,331,899 | B1 | * | 12/2001 | Samadani ................... 358/1.9 |
| 6,344,900 | B1 | * | 2/2002 | Hidaka ....................... 358/1.9 |
| 6,373,596 | B1 | * | 4/2002 | Hidaka ....................... 358/1.9 |
| 6,388,769 | B1 | * | 5/2002 | Hidaka ....................... 358/1.9 |
| 6,480,202 | B1 | * | 11/2002 | Deguchi et al. ............ 345/600 |
| 6,580,524 | B1 | * | 6/2003 | Weichmann et al. ......... 358/1.9 |
| 6,614,555 | B1 | * | 9/2003 | Hidaka ....................... 358/1.9 |
| 6,628,823 | B1 | * | 9/2003 | Holm ......................... 382/162 |

FOREIGN PATENT DOCUMENTS

| | | |
|---|---|---|
| DE | 41 19 690 A1 | 8/1992 |
| DE | 195 33 810 A1 | 3/1997 |
| DE | 195 33 811 A1 | 3/1997 |
| DE | 196 31 469 C1 | 2/1998 |
| DE | 197 44 999 A1 | 7/1998 |
| EP | 0 494 034 A2 | 7/1992 |
| EP | 0 851 669 A2 | 7/1998 |
| EP | 0 874 229 A1 | 10/1998 |
| EP | 0 898 417 A2 | 2/1999 |

* cited by examiner

Primary Examiner—Gabriel Garcia
(74) Attorney, Agent, or Firm—Laurence A. Greenberg; Werner H. Stemer; Ralph E. Locher

(57) ABSTRACT

A method of producing a color space transformation, with which the color values of a first printing process can be converted into the color values of a second printing process so that the black build-up of the first printing process is substantially transferred into the second printing process and the visual impression of the printed colors in the two printing processes is substantially the same, includes characterizing the color reproduction characteristics of the printing processes by color profiles, which specify an association between the device dependent color values of the printing processes and the color values of a device independent color space. From the color profiles, lightness curves are determined as a function of the black printing ink and color curves are determined as a function of the non-black printing inks and linked to form the color space transformation sought.

6 Claims, 6 Drawing Sheets

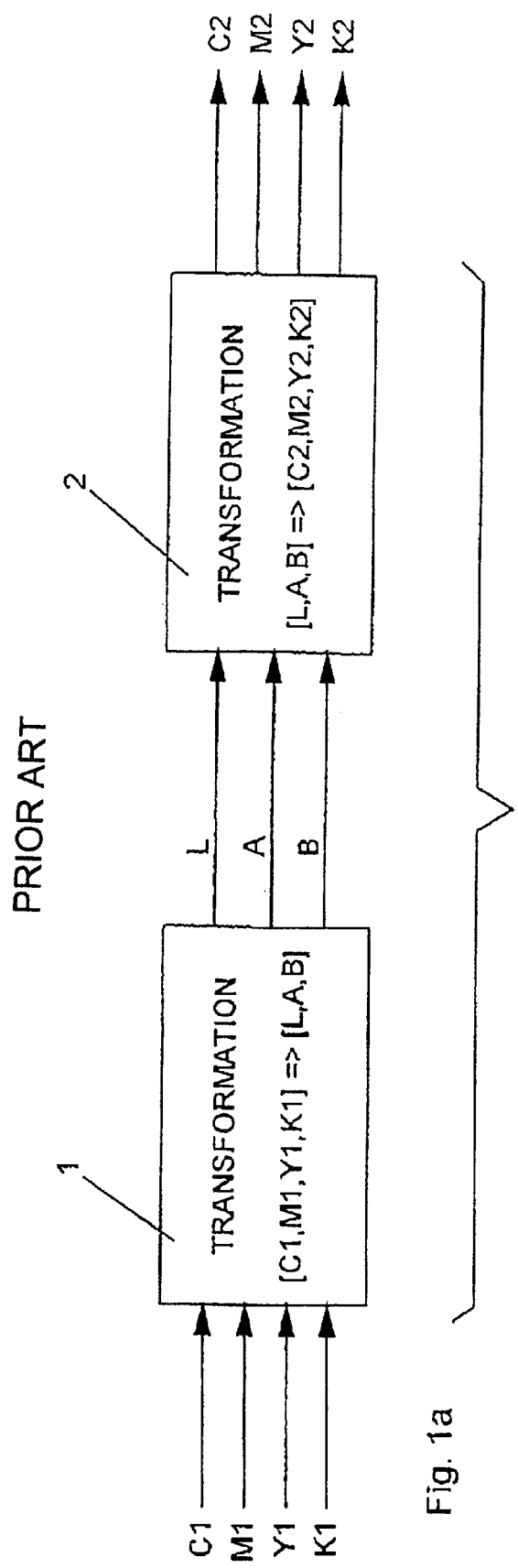
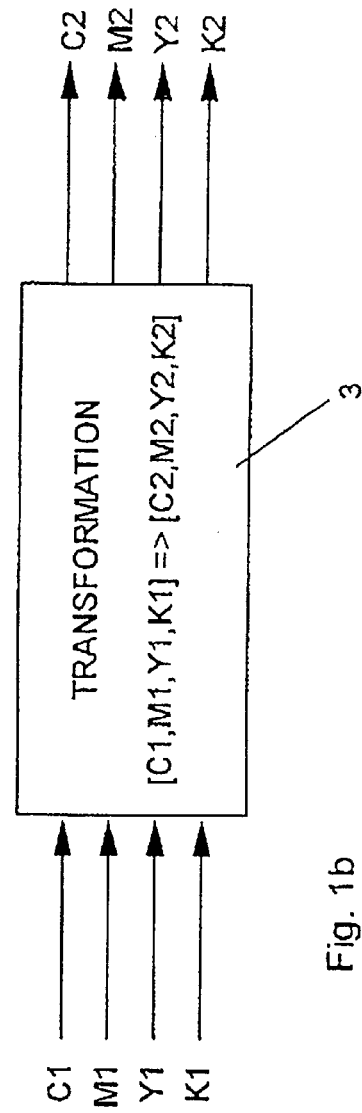
Fig. 1a
Fig. 1b

METHOD OF ADAPTING A PRINTING PROCESS WHILE MAINTAINING THE BLACK BUILD-UP

CROSS REFERENCE TO RELATED APPLICATIONS

This application is a continuation of copending International Application No. PCT/DE00/02959, filed Aug. 31, 2000, which designated the United States.

BACKGROUND OF THE INVENTION

Field of the Invention

The invention relates to the field of electronic reproduction technology and pertains to a method of adapting color values that have been produced for a first printing process to a second printing process so that the visual impression of the colors in both printing processes is the same.

In reproduction technology, printing originals for printed pages are produced that contain all the elements to be printed, such as texts, graphics and images. In the case of the electronic production of printing originals, these elements are present in the form of digital data. For an image, the data are produced, for example, by the image being scanned point-by-point and line-by-line in a scanner, each image point being broken down into color components and the color components being digitized. Images are usually broken down in a scanner into the color components red, green, and blue [R,G,B], that is to say, into the components of a three-dimensional color space. For the colored print, however, other color components are needed. In the case of four-color printing, these are the printing colors cyan, magenta, yellow, and black [C,M,Y,K], that is to say, the components of a four-dimensional color space. For such a purpose, the image data from the RGB color space of the scanner must be transformed into the CMYK color space of the printing process to be used.

Such color space transformations are needed in reproduction technology because all the devices and processes have their restrictions and special features in the representation and reproduction of the colors, and all the devices and processes have different such characteristics. For this reason, for various devices and processes such as scanners, monitors, proof output devices, printing processes, and so on, there are different color spaces that respectively describe the color characteristics of the device or process in an optimum way and that are referred to as device dependent color spaces.

In addition to the device dependent color spaces there are also device independent color spaces, which are based on the human visual characteristics of a standard observer, as referred to in the prior art. Such color spaces are, for example, the XYZ color space defined by the Commission Internationale d'Éclairage (CIE) standardization commission or the LAB color space that is derived therefrom, the LAB color space having made more progress in the technology. If one wishes to know whether two colors will be sensed by the human eye as the same or different, then the measurement of the XYZ or LAB color components is sufficient for such a purpose. The LAB color components form a color space with a lightness axis [L] and two color axes [A,B], which can be imagined in the plane of a color circle through whose center the lightness axis runs. The LAB color components are related to the XYZ color components through nonlinear conversion equations.

A device or process can be characterized in terms of its color characteristics by all the possible value combinations of the associated device dependent color space being assigned the LAB color components that a human sees in the case of the colors produced with these value combinations. For a printing process, the various CMYK value combinations respectively produce a different printed color. Using a color measurement instrument, the LAB components of the printed colors may be determined and assigned to the CMYK value combinations. Such an assignment, which sets the device dependent colors produced with a device or process in a relationship with a device independent color space (XYZ or LAB), is also referred to as a color profile, as an output color profile in the case of a printing process. The definition and data formats for color profiles have been standardized by the International Color Consortium (ICC) Specification ICC.1:1998–09. In an ICC color profile, the association between the color spaces in both directions is stored, for example, the association LAB=f1 (CMYK) and the inverted association CMYK=f2 (LAB).

The association defined by a color profile can be implemented by a look-up table. If, for example, the CMYK color components of a printing process are to be assigned the LAB color components, the look-up table must have a storage location for each possible value combination of the CMYK color components, in which location the associated LAB color components are stored. The simple association method has the disadvantage, however, that the look-up table can become very large. If each of the color components [C,M,Y,K] has been digitized with 8 bits, that is to say has $2^8$=256 density steps, there are $256^4$=4,294,967,296 possible value combinations of the CMYK color components. The look-up table must, therefore, have 4,294,967,296 storage cells each with a word length of 3 bytes (one byte each for L,A,B). The look-up table therefore reaches a size of 12.3 gigabytes.

To reduce the size of the look-up table, a combination of look-up table and interpolation method is, therefore, used to describe a color profile and to implement a corresponding color space transformation. The associations for all the possible value combinations of the CMYK color components are not stored in the look-up table; only those for a relatively coarse, regular grid of reference points in the CMYK color space. The grid is formed by only each kth value being taken as a grid point in each component direction. For k=16, therefore, in each component each 16th value from the 256 possible values is taken as a grid point. Accordingly, in each component direction, the grid has 256/16=16 grid points, that is to say, 16×16×16×16=65,536 grid points for the entire CMYK color space. For each grid point, the associated components of the LAB color space are stored as reference points in the look-up table. For CMYK value combinations that lie between the grid points, the LAB values to be assigned are interpolated from the adjacent reference points. For the inverted assignment CMYK=f2 (LAB), a grid of 16×16×16=4096 grid points, for example, is formed in the LAB color space, and the associated CMYK values are stored as reference points in the look-up table.

The assignments given in the color profiles between device dependent color spaces and a device independent color space (e.g., LAB) can be used for the color space transformation between the device dependent color spaces, so that, for example, the color values [C1,M1,Y1,K1] of a first printing process can be converted into the color values [C2,M2,Y2,K2] of a second printing process such that, according to the visual impression, the second print has the same colors as the first print. FIGS. 1a and 1b show a color space transformation for such a printing process adaptation according to the prior art in a block diagram. In FIG. 1a, a first color space transformation (1) from the color values

[C1,M1,Y1,K1] of the first printing process into LAB color values, and a second color space transformation (2) from the LAB color values into the color values [C2,M2,Y2,K2] of the second printing process are carried out one after another. The two color space transformations (1) and (2) can also be combined into an equivalent color space transformation (3), which assigns the color values [C1,M1,Y1,K1] and the color values [C2,M2,Y2,K2] directly to one another (FIG. 1b). Because in each case, through the device independent LAB intermediate color space, the color values [C1,M1,Y1,K1] and [C2,M2,Y2,K2] that result in the same LAB color values are assigned to one another, the associated printing colors in the two printing processes are sensed as visually the same within the printing color gamut. However, one disadvantage of such a method is that the black build-up (as it is referred to in the art) of the first printing process is lost. Black build-up is understood to mean the composition of printed colors with respect to their proportion of the black printing ink K. In particular, the aim is for pure black colors, such as blocks of text, for example, to be built up only with the printing ink K, that is to say contain no CMY components. With the above-described method according to the prior art, it is not possible to achieve the situation where pure black colors that, in the first printing process, are built up only with the printing ink K are also built up only with the printing ink K in the second printing process. In general, based upon visual equivalence, that is to say, the same LAB color values, in the second printing process mixed colors are assigned that, although they predominantly contain proportions of the printing ink K, also contain CMY components. Among other things, following the printing process adaptation, such a process leads to black texts and lines being given colored edges in the event of register errors in the printing machine.

In addition, in the process according to the prior art, it is not ensured either that the lightness curve in black or gray colors, as set in the first printing process, will be reproduced correctly in the second printing process following the adaptation. The reason is that the associated black or gray colors of the second printing process contain additional CMY components, and that the proportion of K is formed in accordance with the lightness curve of the second printing process, which was set during the creation of the color profile of the second printing process.

A further disadvantage of the above-described method is that the black build-up of the first printing process is lost in the chromatic colors. Because, in the four-color printing system, it is possible for the same color to be printed with many different CMYK value combinations, the system is ambiguous, and it is possible to choose whether gray colors and dark colors are to be printed with a relatively high proportion of the black printing ink K and correspondingly low proportions of the colored printing inks [C,M,Y] or with a low proportion of K and correspondingly higher proportions of [C,M,Y]. The decision is made with prior art methods, such as under-color removal (UCR) or gray-component reduction (GCR). According to the conventional method of printing process adaptation described, the decision that was made for the color values [C1,M1,Y1,K1] of the first printing process is not transferred into the associated color values [C2,M2,Y2,K2] of the second printing process. Instead, the associated color values [C2,M2,Y2,K2] are formed in accordance with the black build-up of the second printing process, which was set when the color profile of the second printing process was created.

SUMMARY OF THE INVENTION

It is accordingly an object of the invention to provide a method of adapting a printing process while maintaining the black build-up that overcomes the hereinafore-mentioned disadvantages of the heretofore-known devices of this general type and that avoids the aforementioned restrictions and disadvantages and specifies a method of printing process adaptation from a first printing process with the color values [C1,M1,Y1,K1] to a second printing process with the color values [C2,M2,Y2,K2] that operates based upon given color profiles for the two printing processes, and with both the visually sensed colors and the black build-up of the first printing process being maintained.

With the foregoing and other objects in view, there is provided, in accordance with the invention, A method for producing a color space transformation, including the steps of converting color values of a first printing process into color values of a second printing process to substantially transfer black build-up of the first printing process into the second printing process and to make a visual impression of printed colors in both printing processes be substantially the same by characterizing color reproduction characteristics of the first printing process with a first color profile specifying an association between device dependent color values of the first printing process and color values of a device independent color space, characterizing color reproduction characteristics of the second printing process with a second color profile specifying an association between device dependent color values of the second printing process and color values of a device independent color space, determining a first lightness curve from the first color profile, determining a second lightness curve from the second color profile, calculating an inverted lightness curve from the second lightness curve, linking the inverted lightness curve and the first lightness curve to form a first transformation function, determining second transformation functions from the first color profile, determining third transformation functions from the second color profile, calculating inverted transformation functions from the third transformation functions, linking the inverted transformation functions and the second transformation functions to form fourth transformation functions, and joining the fourth transformation functions to the first transformation function to form a color space transformation between color values of the first printed process and color values of the second printing process.

In accordance with another mode of the invention, before inverting the second lightness curve, the second lightness curve is corrected to be monotonic.

In accordance with a further mode of the invention, before inverting the third transformation functions, the third transformation functions is corrected to be monotonic.

In accordance with an added mode of the invention, the color space transformation is corrected by determining the device independent color values from the first color profile for the device dependent color values of the first printing process, determining the device independent color values from the second color profile for the device dependent color values of the second printing process associated with the color space transformation, calculating corrected color values from a deviation between the device independent color values determining corrected device dependent color values from the corrected color values, and replacing, in the color space transformation, the associated device dependent color values of the second printing process with the corrected device dependent color values.

In accordance with a concomitant mode of the invention, the correction of the color space transformation is repeatedly carried out until a mean deviation between the device independent color values falls below a threshold value.

Other features that are considered as characteristic for the invention are set forth in the appended claims.

Although the invention is illustrated and described herein as embodied in a method of adapting a printing process while maintaining the black build-up, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1a is a block diagram for a prior art printing process adaptation;

FIG. 1b is a block diagram for an equivalent prior art printing process adaptation of FIG. 1a;

DESCRIPTION OF THE PREFERRED EMBODIMENTS

Figure 2A:
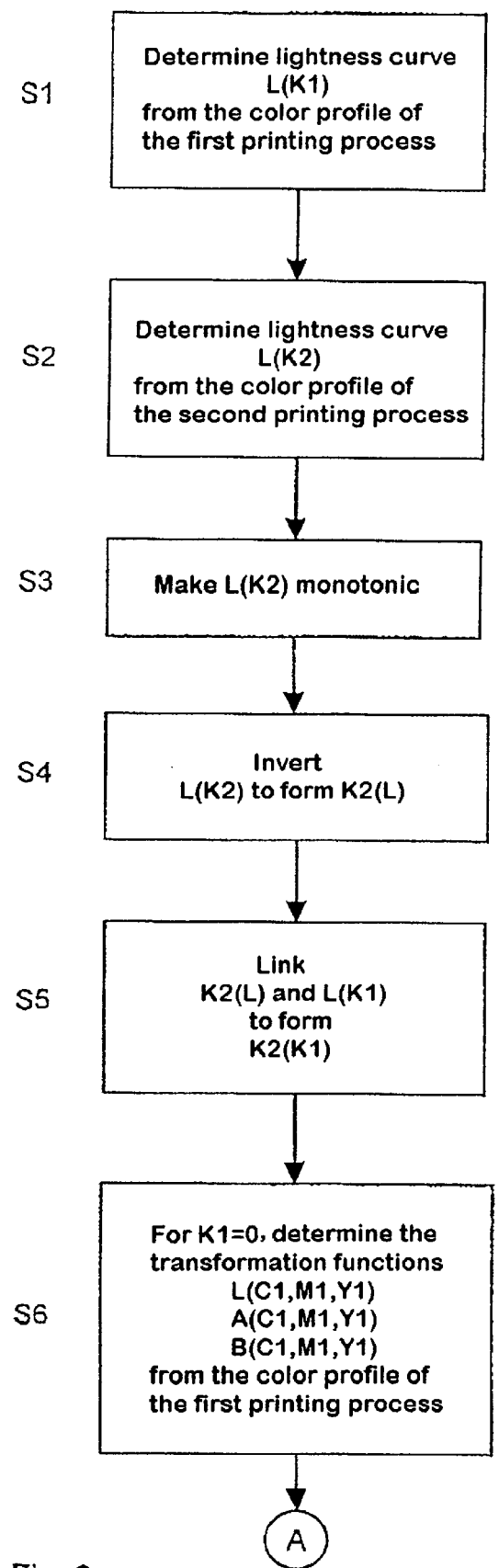
FIGS. 2a, 2b, and 2c each are a portion of a continuous flow chart for producing a printing process adaptation according to the invention.
Figure 2B:
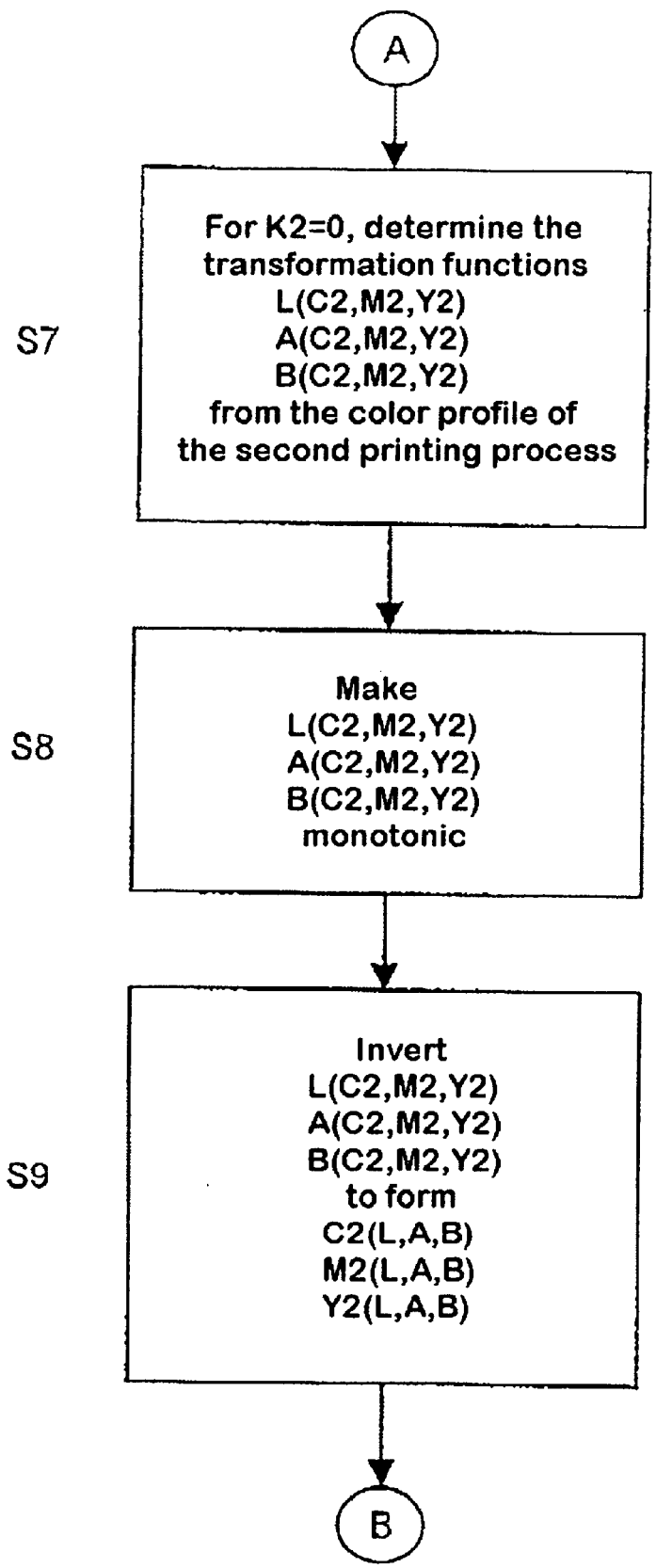
Figure 2C:
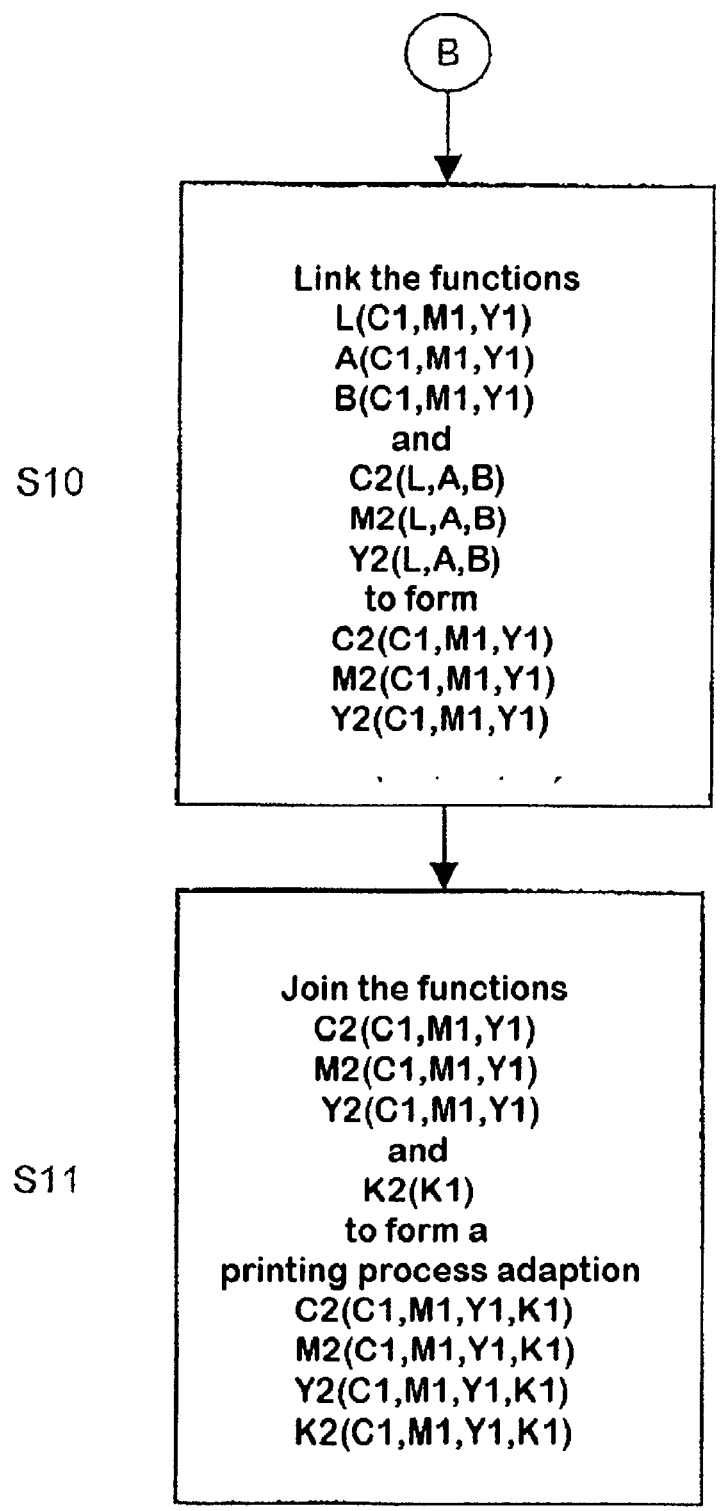

Referring now to the figures of the drawings in detail and first, particularly to FIGS. 2a to 2c thereof, there is shown a flow diagram indicating the individual steps of the method according to the invention. In step S1, firstly, the lightness curve as a function of the color value K1 is determined, that is to say, the function L(K1), from the color profile of the first printing process. As explained previously, the color profile specifies a relationship between the LAB color values and the color values [C1,M1,Y1,K1]. The lightness curve sought is obtained therefrom by setting C1=0, M1=0, and Y1=0 and varying the value K1. If the color values [C1,M1,Y1,K1] are each stored with 8 bits, for example, K1 is varied from 0 . . . 255. The L values resulting therefrom give the lightness curve L(K1).

Figure 3:
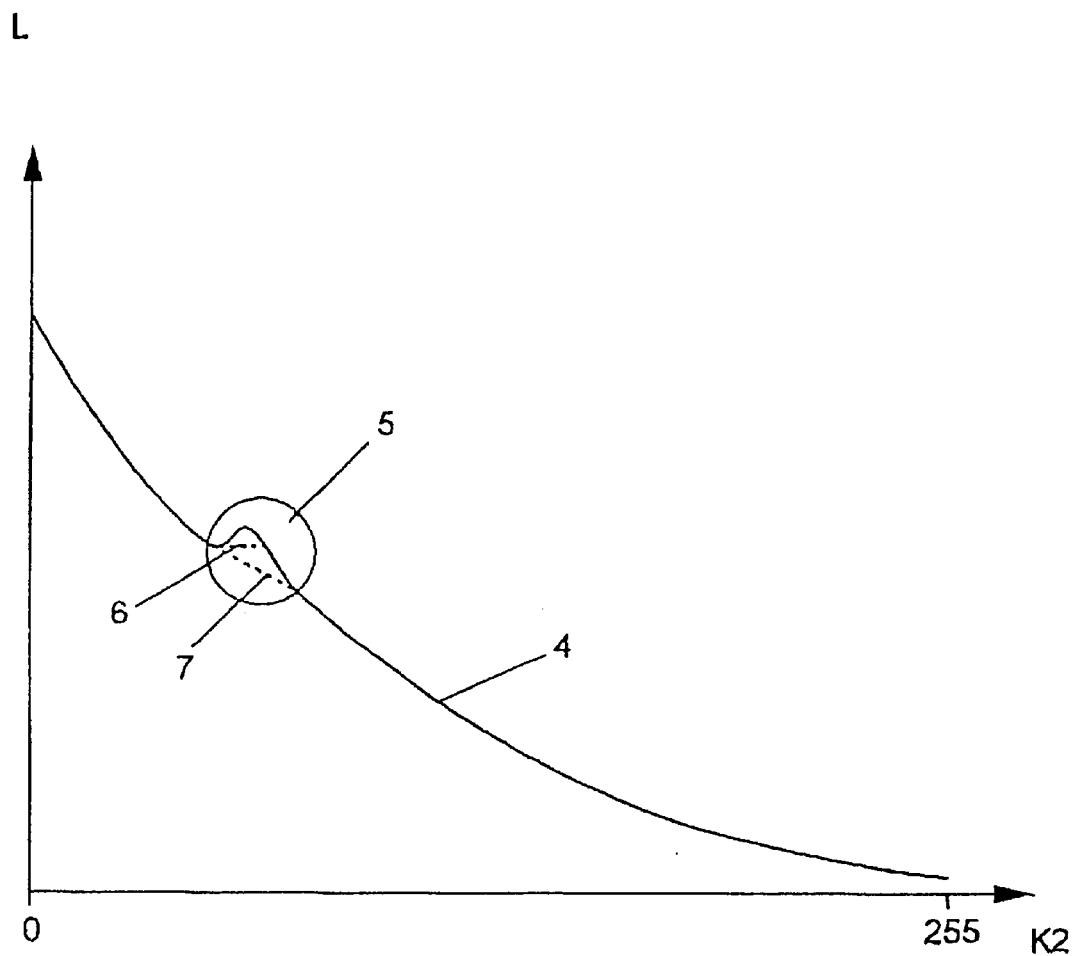
FIG. 3 is a graph illustrating a non-monotonic lightness curve according to the invention.

In step S2, the lightness curve L(K2) is determined in the same way from the color profile of the second printing process. The function L(K2) generally has a monotonic course. If, however, it is not monotonic at some points, as a result of calculation inaccuracies or other influences, it is modified in step S3 such that it is given a monotonic course. FIG. 3 illustrates the step using an example. The function L(K2), that is to say, the lightness curve (4), in the example has a course that generally falls monotonically, apart from the region (5), in which the function rises. The non-monotonic character has been shown much exaggerated in FIG. 3 for the purpose of clarification. Using any desired suitable method, the course of the function is modified such that it becomes monotonic even in the region (5). For example, with increasing K2 values, the function value L is kept constant until smaller function values L occur again (6). Another possibility is to smooth the function with an interpolation method (7). For the invention, it is unimportant which method is used to produce the monotonic character of the function L(K2). It is important merely that the function is made monotonic so that the following method step S4 can be carried out.

In step S4, the lightness curve L(K2) is inverted, so that the function K2(L) is obtained. Then, in step S5, the functions L(K1) and K2(L) are linked by being "connected one after another", that is to say, the function:

$$K2[L(K1)]=K2(K1) \quad (1)$$

The transformation function specifies, for purely black or gray colors, which color value K2 has to be used in the second printing process so that the same visual lightness impression is produced as by the color value K1 in the first printing process.

In step S6, the color profile of the first printing process is used to determine the transformation functions:

$$L(C1,M1,Y1)\ A(C1,M1,Y1)\ B(C1,M1,Y1) \quad (2)$$

For such a purpose, K1 is set equal to 0, and the color components C, M, and Y are varied over their value range, e.g., C=0 . . . 255, M=0 . . . 255, Y=0 . . . 255. For all the possible value combinations of [C,M,Y], the associated LAB color values, that is to say, the above transformation functions, are then given by the color profile.

In step S7, the color profile of the second printing process is used in the same way to determine the corresponding transformation functions:

$$L(C2,M2,Y2)\ A(C2,M2,Y2)\ B(C2,M2,Y2) \quad (3)$$

The functions generally have a monotonic course. However, if they are not monotonic at some points, they are modified in step S8 such that they are given a monotonic course. The modification is done in an analogous way as that explained using the example of FIG. 3. However, as distinct from FIG. 3, it is not a curve that has to be smoothed but areas over the three independent variables [C2,M2,Y2]. The method of making the curves monotonic then has to be expanded appropriately to a plurality of dimensions.

In step S9, the system of functions in accordance with equations (3) is then inverted, so that the functions:

$$C2(L,A,B)\ M2(L,A,B)\ Y2(L,A,B) \quad (4)$$

are obtained. Then, in step S10, these functions are linked with the transformation functions (according to the equations (2)) obtained in step S6, by "connecting them one after another", that is to say the functions:

$$C2(C1,M1,Y1)\ M2(C1,M1,Y1)\ Y2\ (C1,M1,Y1) \quad (5)$$

are formed. For pure colors, that is to say, for colors without a black component, these functions specify the color values [C2,M2,Y2] that have to be used in the second printing process so that the same visual color and lightness impression is produced as that using the color values [C1,M1,Y1] in the first printing process.

In step S11, finally, the transformation functions for pure colors obtained in step S10 in accordance with equations (5), and the transformation function for pure black or gray colors obtained in step S5 in accordance with equation (1) are joined to make a four-dimensional transformation:

$$C2(C1,M1,Y1,K1)\ M2(C1,M1,Y1,K1)\ Y2\ (C1,M1,Y1,K1)\ K2\ (C1,M1,Y1,K1) \quad (6)$$

with which, for each combination of color values [C1,M1,Y1,K1] given for the first printing process, a corresponding combination of color values [C2,M2,Y2,K2] for the second printing process can be determined. The four-dimensional transformation is the printing process adaptation sought.

If the printing process adaptation is to be created, for example, in the form of a look-up table with 16×16×16×16 reference values, the transformation functions for pure colors (equations (5)) and the transformation function for pure black or gray colors (equation (1)) can be joined in the following way. Each of the 16×16×16×16 look-up table locations corresponds to a value combination [C1,M1,Y1,K1] that is to be referred to below as an "address". In such a case, each of the four components can assume 16 discrete values. In each look-up table location, value combinations [C2,M2,Y2,K2] are to be stored, which are referred to below as "function values". Firstly, for all the addresses in accordance with the equations (5), the associated function values [C2,M2,Y2] are written into the look-up table. Here, the address component K1 does not play any part, that is to say, it can assume any of the possible 16 values. All the addresses with a specific combination of address components [C1,M1,Y1] are given the function values [C2,M2,Y2] assigned in accordance with the equations (5). Then, the associated function value K2 is written to all the addresses in accordance with equation (1). Here, the address components [C1,M1,Y1] do not play any part, that is to say, they can assume any of the possible 16×16×16 combinations. All the addresses with a specific address component K1 are given the function value K2 assigned in accordance with the equation (1). In such a case, the function values [C2,M2,Y2] written previously are not changed.

The four-dimensional color space transformation obtained by the method according to the invention described previously fulfils the important requirements on a printing process adaptation maintaining the black build-up from the first printing process. Pure black or gray colors also remain pure black or gray in the second printing process, and the visually sensed lightnesses agree for such colors. In addition, pure colors without a black component have the same visually sensed colors and lightnesses in both printing processes. However, there may also still be residual errors, whose magnitude depends on how great the difference is between the first and the second printing process. In the case of impure colors, that is to say, colors with a black component, the LAB color values in the two printing processes do not quite agree. In addition, in the case of pure black or gray colors, the LAB color values may possibly be somewhat different if the black printing ink of the second printing process has a lighter color cast than that of the first printing process or vice-versa. To reduce such residual errors, the printing process adaptation obtained in step S11 (FIG. 2c) from color values [C1,M1,Y1,K1] of the first printing process to color values [C2,M2,Y2,K2] of the second printing process can be optimized further.

Figure 4:
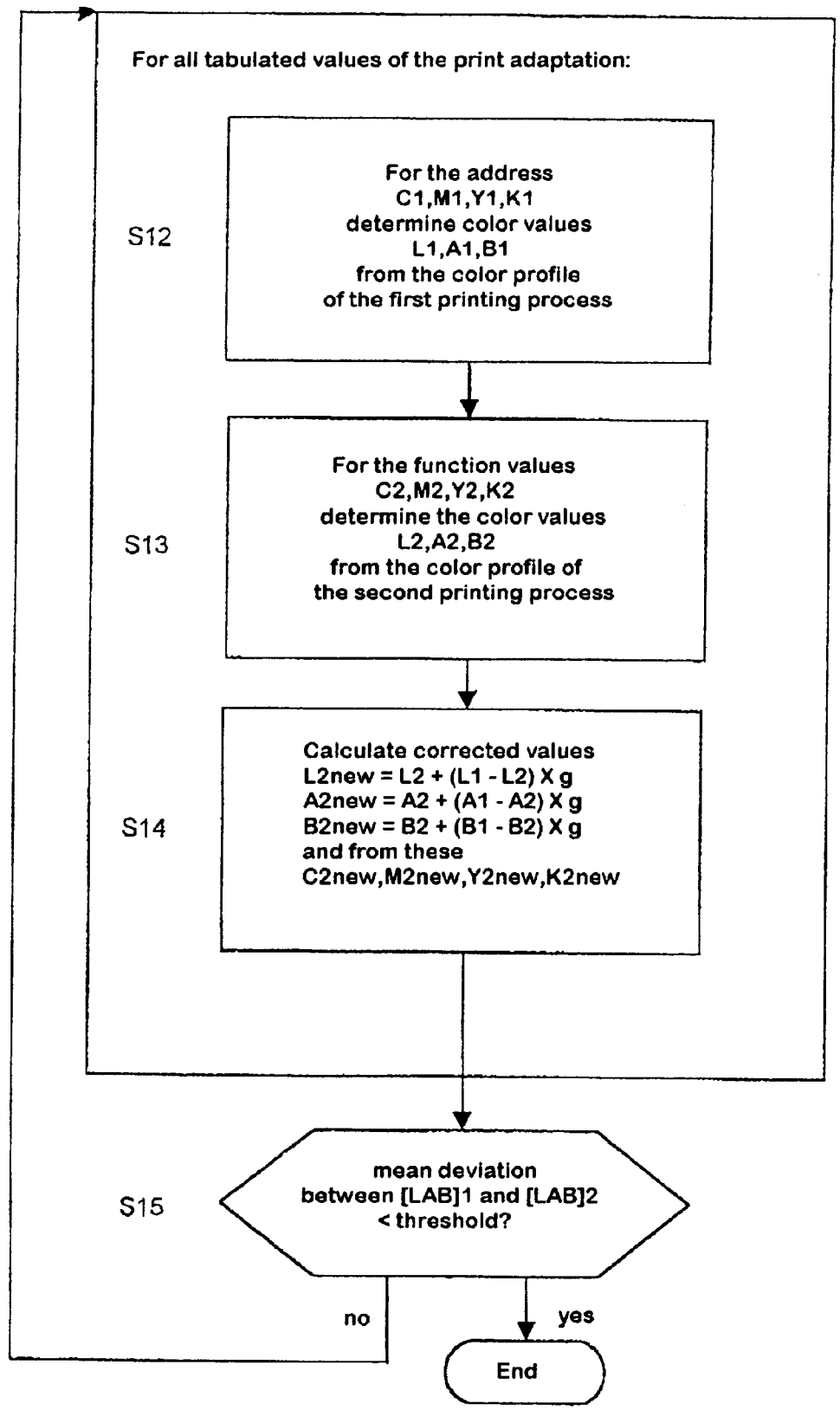
FIG. 4 is a flow chart for optimization of a printing process adaptation according to the invention.

FIG. 4 shows the further optimization of the printing process adaptation as a flow diagram. For all the tabulated values of the print adaptation, the steps S12, S13, and S14 are carried out one after another. In step S12, for an address [C1,M1,Y1,K1], the color values [L1,A1,B1] are determined from the color profile of the first printing process. In step S13, for the function values [C2,M2,Y2,K2] associated with the address, the color values [L1,A2,B2] are determined from the color profile of the second printing process. For optimal print adaptation, these LAB color values from the first and second printing process should agree for all colors. From the remaining differences, corrected color values [L2new,A2new,B2new] are calculated in step S14:

$$L2new=L2+(L1-L2)*g \quad A2new=A2+(A1-A2)*g \quad B2new=B2+(B1-B2)*g \quad (7)$$

Here, the differences are multiplied by a weighting factor g<1 and added to the color values [L2,A2,B2] such that the new color values [L2new,A2new,B2new] lie closer to the corresponding color values [L1,A1,B1] of the first printing process. From the new LAB color values [L2new,A2new,B2new], through the color profile of the second printing process, appropriately corrected new function values [C2new,M2new,Y2new,K2new] are determined and inserted into the print adaptation table instead of the previous function values [C2,M2,Y2,K2]. After such a correction has been carried out for all the tabulated values, a check is made in S15 to see whether the mean deviation between the color values [L1,A1,B1] of the first printing process and the associated color values [L2,A2,B2] determined from the corrected function values falls below a threshold. If the values do not yet fall below the threshold, that is to say, if the deviations are still too large, the correction cycle is carried out once more for all the tabulated values, otherwise the optimization is completed. As a variant of the correction method, it is possible to use the addresses [C1,M1,Y1,K1] and the function values [C2,M2,Y2,K2] to determine the device independent color values [X1,Y1,Z1] and the color values [X2,Y2,Z2] through the color profiles as well, and to use their differences to calculate corrected color values [X2new,Y2new,Z2new], which are then in turn converted into corrected function values [C2new,M2new,Y2new,K2new]. A further variant is to reduce the weighting factor g during each iteration of the correction cycle, in order to approach the optimum slowly.

Based upon the above description in connection with the drawings, it can be seen that the method according to the invention produces a color space transformation that converts color values of a first printing process into color values of a second printing process to substantially transfer black build-up of the first printing process into the second printing process and to make a visual impression of printed colors in both printing processes be substantially the same. The conversion is performed by the color reproduction characteristics of the first printing process being characterized with a first color profile specifying an association between device dependent color values [C1,M1,Y1,K1] of the first printing process and color values [L,A,B] of a device independent color space and by the color reproduction characteristics of the second printing process being characterized with a second color profile specifying an association between device dependent color values [C2,M2,Y2,K2] of the second printing process and color values [L,A,B] of a device independent color space. A first lightness curve L(K1) is determined from the first color profile and a second lightness curve L(K2) is determined from the second color profile. An inverted lightness curve K2(L) is then calculated from the second lightness curve L(K2). Next, the inverted lightness curve K2(L) and the first lightness curve L(K1) are linked to form a first transformation function K2(K1). Second transformation functions L(C1,M1,Y1), A(C1,M1,Y1), B(C1,M1,Y1) are determined from the first color profile. Third transformation functions L(C2,M2,Y2), A(C2,M2,Y2), B(C2,M2,Y2) are determined from the second color profile. Inverted transformation functions C2(L,A,B), M2(L,A,B), Y2(L,A,B) are calculated from the third transformation functions L(C2,M2,Y2), A(C2,M2,Y2), B(C2,M2,Y2). Then, the inverted transformation functions C2(L,A,B), M2(L,A,B), Y2(L,A,B) and the second transformation functions L(C1,M1,Y1), A(C1,M1,Y1), B(C1,M1,Y1) are linked to form fourth transformation functions C2(C1,M1,Y1), M2(C1,M1,Y1), Y2(C1,M1,Y1). Finally, the fourth transformation functions C2(C1,M1,Y1), M2(C1,M1,Y1), Y2(C1,M1,Y1) are joined to the first transformation function K2(K1) to form a color space transformation between color values [C1,M1,Y1,K1] of the first printed process and color values [C2,M2,Y2,K2] of the second printing process.

We claim:

1. A method for producing a color space transformation, which comprises:

converting color values of a first printing process into color values of a second printing process to substantially transfer black build-up of the first printing process into the second printing process and to make a visual impression of printed colors in both printing processes be substantially the same by:

characterizing color reproduction characteristics of the first printing process with a first color profile specifying an association between device dependent color values of the first printing process and color values of a device independent color space;

characterizing color reproduction characteristics of the second printing process with a second color profile specifying an association between device dependent color values of the second printing process and color values of a device independent color space;

determining a first lightness curve from the first color profile;

determining a second lightness curve from the second color profile;

calculating an inverted lightness curve from the second lightness curve;

linking the inverted lightness curve and the first lightness curve to form a first transformation function;

determining second transformation functions from the first color profile;

determining third transformation functions from the second color profile;

calculating inverted transformation functions from the third transformation functions;

linking the inverted transformation functions and the second transformation functions to form fourth transformation functions; and joining the fourth transformation functions to the first transformation function to form a color space transformation between color values of the first printed process and color values of the second printing process.

2. The method according to claim 1, which further comprises, before inverting the second lightness curve, correcting the second lightness curve to be monotonic.

3. The method according to claim 1, which further comprises, before inverting the third transformation functions, correcting the third transformation functions to be monotonic.

4. The method according to claim 1, which further comprises correcting the color space transformation by:

determining the device independent color values from the first color profile for the device dependent color values of the first printing process;

determining the device independent color values from the second color profile for the device dependent color values of the second printing process associated with the color space transformation;

calculating corrected color values from a deviation between the device independent color values;

determining corrected device dependent color values from the corrected color values; and replacing, in the color space transformation, the associated device dependent color values of the second printing process with the corrected device dependent color values.

5. The method according to claim 4, which further comprises repeatedly carrying out the correction of the color space transformation until a mean deviation between the device independent color values falls below a threshold value.

6. A method for producing a color space transformation with which color values of a first printing process are converted into color values of a second printing process to substantially transfer black build-up of the first printing process into the second printing process and to make a visual impression of printed colors in both printing processes be substantially the same, color reproduction characteristics of the first printing process being characterized with a first color profile specifying an association between device dependent color values of the first printing process and color values of a device independent color space, and color reproduction characteristics of the second printing process being characterized with a second color profile specifying an association between device dependent color values of the second printing process and color values of a device independent color space, the method which comprises:

determining a first lightness curve from the first color profile;

determining a second lightness curve from the second color profile;

calculating an inverted lightness curve from the second lightness curve;

linking the inverted lightness curve and the first lightness curve to form a first transformation function;

determining second transformation functions from the first color profile;

determining third transformation functions from the second color profile;

calculating inverted transformation functions from the third transformation functions;

linking the inverted transformation functions and the second transformation functions to form fourth transformation functions; and joining the fourth transformation functions to the first transformation function to form a color space transformation between color values of the first printed process and color values of the second printing process.

* * * * *